Jan. 17, 1967  E. H. KRAUTHEIM ET AL  3,298,679
ROTARY KILN SCRAPER
Filed April 29, 1964
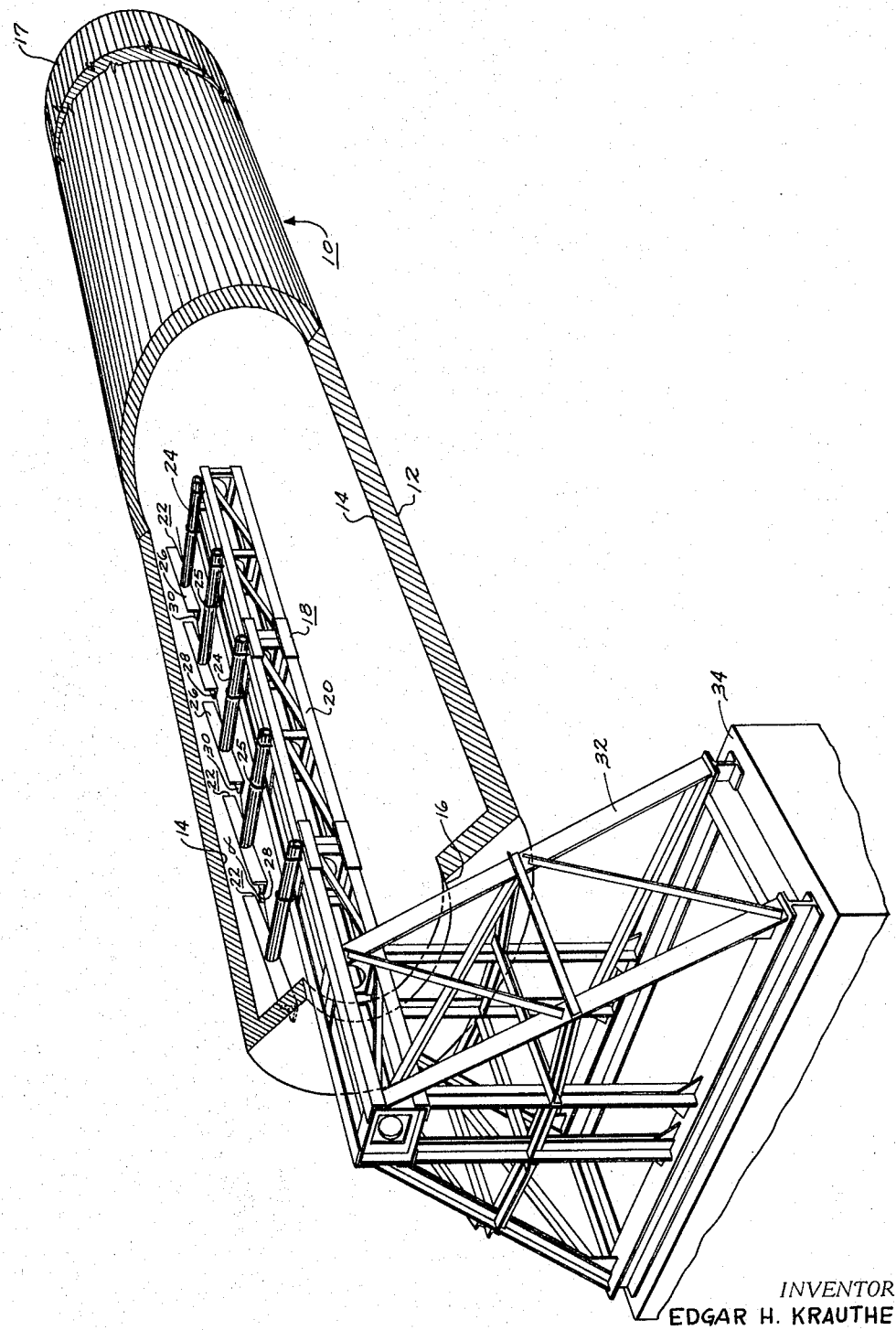
INVENTORS
EDGAR H. KRAUTHEIM &
BY VACLAV C. VEVERKA
ATTORNEY

3,298,679
ROTARY KILN SCRAPER
Edgar H. Krautheim and Vaclav C. Veverka, Pittsburgh, Pa., assignors to Harbison-Walker Refractories Company, Pittsburgh, Pa., a corporation of Pennsylvania
Filed Apr. 29, 1964, Ser. No. 363,514
1 Claim. (Cl. 263—33)

The present invention relates to a rotary kiln having a scraper assembly disposed therein to preclude the adherence of charge materials to the refractory lining surfaces at the charge end thereof.

One of the most important of the high temperature process furnaces is the direct fired rotary kiln. It replaces the ordinary rotary dryer when wall temperature exceeds that which can be tolerated by a bare metal shell (700 to 800° F.) for carbon steel. Rotary kiln shells are lined in part or for their entire length with refractory brick to prevent overheating of the shell which would weaken it.

In operation, the feed is introduced into the cold end of the kiln by various methods, i.e., inclined chutes, overhung skew conveyors, slurry pipes, etc. The hot product usually is discharged from the lower end of the kiln into quench tanks, onto conveyors, or into other cooling devices.

In many instances, the feed materials processed in the rotary kiln are of the wet slurry or flocculate type and the like, and it is these types with which the present invention is primarily concerned. When a wet type charge material is fed to the kiln for burning, it has a tendency to accumulate on or adhere to the refractory wall lining at the feed end. This presents a problem because, in a relatively short period of time, the accumulation of material becomes extensive and must be removed by shot blasting or laborious mechanical methods.

Accordingly, it is an object of the present invention to provide for substantial elimination of accumulation of charge materials on refractory linings at the feed end of a rotary kiln.

Another object of the invention is to provide a rotary kiln having a scraper assembly disposed therein, for removal of charge materials adhering to the interior walls thereof.

Other objects of the invention will appear hereinafter.

In order to more fully understand the nature and scope of the invention, reference should be had to the following detailed description and drawings, the single figure of which is a perspective view of a combination rotary kiln and scraper assembly including the concepts of the instant invention.

Briefly, according to the present invention, there is provided a rotary kiln consisting of a cylindrical metal shell with a refractory lining therein. In combination therewith, a scraper assembly fixedly is disposed within the kiln, preferably at the feed end, in such a manner that the kiln is rotatable thereabout. The scraper assembly is generally comprised of a plurality of spaced scraper bars or doctor blades mounted longitudinally within the kiln and cantilever support means for the bars, which is generally perpendicular to a longitudinal axis of the kiln. Each scraper bar is substantially parallel to a next adjacent bar, and each bar is slightly biased at an acute angle to a longitudinal axis of the kiln. The working face of the scraper bars is located relatively close to the refractory lining (i.e., ¾" to 3").

More particularly, and with reference to the drawing, a rotary kiln 10 is shown having a cylindrical metal shell 12 with a refractory lining 14 on the interior thereof. It has a feed end 16 and a discharge end 17. An elongated scraper assembly 18 is disposed and suspended within the feed end of the kiln, so the kiln may rotate about it. The scraper assembly is comprised of a cantilever suspended truss support 20, which is a rigid framework of structural steel members secured together by welding or with equivalent fasteners, such as, nuts, bolts, rivets, etc. The truss support may extend almost any desired distance of the feed end of the kiln, within practical structural limits (i.e. 15' to 20'), depending upon the distance which a given charge material adheres to the refractory lining of the kiln.

The truss support includes a plurality of substantially equidistantly spaced bars 24, which extend normal to or transverse of a longitudinal axis of the truss and the kiln. The rods may be either integral with rigid structural members, which form a part of the truss; or may be individual rods secured by U-shaped clip fasteners 25 to the truss, as is shown in the drawing.

At the end of each rod 24 is attached a doctor blade or scraper bar 22, which is preferably of an L shape for structural reasons. Each L-shaped scraper bar is attached at the rear face of one leg 26 to rod 24 by any suitable means, such as, welding, riveting, bolting, etc.; so that the edge 28 of the other leg 30 is contiguously adjacent, but spaced from, the refractory lining 14. Each bar 22 is arranged so that it is substantially parallel to an adjacent bar, and all the bars are at an acute angle α, preferably about 15°, to the longitudinal axis of the kiln. The distance of the blade edge from the refractory lining can vary, for example, between about ¾" and 3" depending upon process specifications, the size grading of charge materials, and the like.

A rigid support frame 32 exterior to, but adjacent, the feed end of the kiln is the means by which the truss support is held substantially rigid during kiln operation. The support frame, similar to the truss, is made up of a series of interconnected structural steel members. The support frame is anchored by any suitable means to an immovable object, such as, a concrete counterweight 34.

Thus, as the kiln rotates and charge material tends to adhere to and build up on the refractory lining, it is removed almost immediately, or at least kept to a minimum thickness by rotation about the edges of the rigid scraper bars. The acute angular relation of the bars to the axis of rotation of the kiln provides a gang plowing action to more effectively remove the adhering material.

It should be appreciated that the particular design of the truss support and support frame may vary, depending upon the desired length of the truss support, the size of the kiln, the type of charge material, and the maximum torque that can be expected when the blades engage charge material. The type of structural members and fastening means, also, is variable depending on strength requirements from kiln to kiln.

Having thus described the invention in detail and with sufficient particularity as to enable those skilled in the art to practice it, what is desired to have protected by Letters Patent is set forth in the following claim.

We claim:

In combination with a rotary kiln including a cylindrical metal shell with a refractory lining therein and having a feed end and a discharge end, a stationary, elongated scraper assembly disposed within the feed end of the kiln, said kiln being rotatable thereabout, said scraper assembly consisting of a truss support, said support having a plurality of equidistantly spaced rods transverse to and along the longitudinal axis thereof, an L-shaped scraper bar attached to each rod and disposed so that each bar is substantially parallel to an adjacent bar at an acute angle to the longitudinal axis of the kiln but disposed adjacent the refractory lining, and a rigid support frame adjacent the feed end of the kiln attached to the truss support anchored to an immovable object.

References Cited by the Examiner

UNITED STATES PATENTS

| | | | |
|---|---|---|---|
| 660,251 | 10/1900 | Gray | 165—94 |
| 1,004,085 | 9/1911 | Ross | 263—33 X |
| 2,169,414 | 8/1939 | Giddings | 30—172 |
| 2,187,922 | 1/1940 | West et al. | 263—33 |
| 2,301,855 | 11/1942 | Cliffe | 263—32 |

DONLEY J. STOCKING, *Primary Examiner.*

JOHN J. CAMBY, FREDERICK L. MATTESON, JR.,
*Examiners.*

A. D. HERRMANN, *Assistant Examiner.*